Patented Feb. 25, 1930

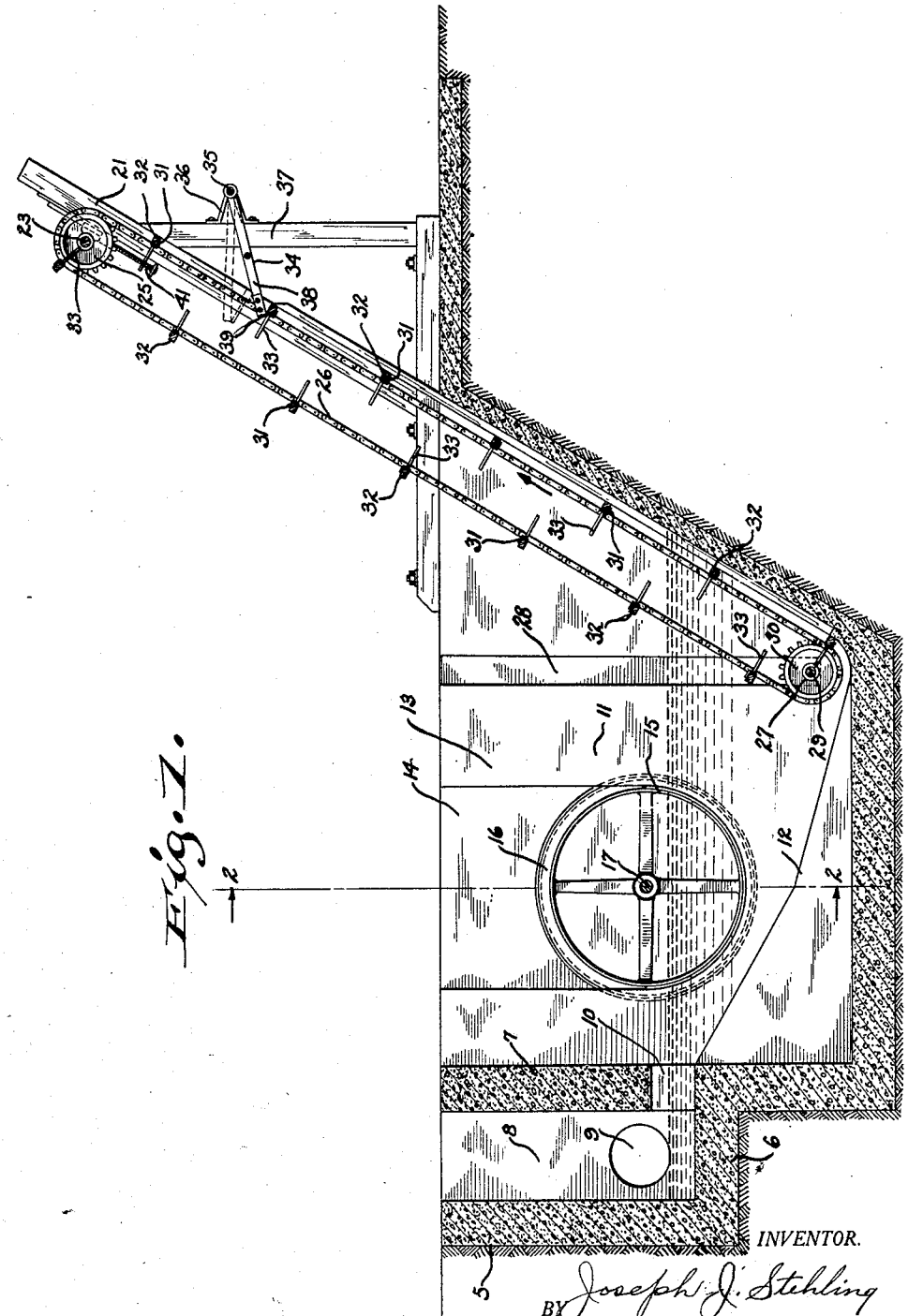

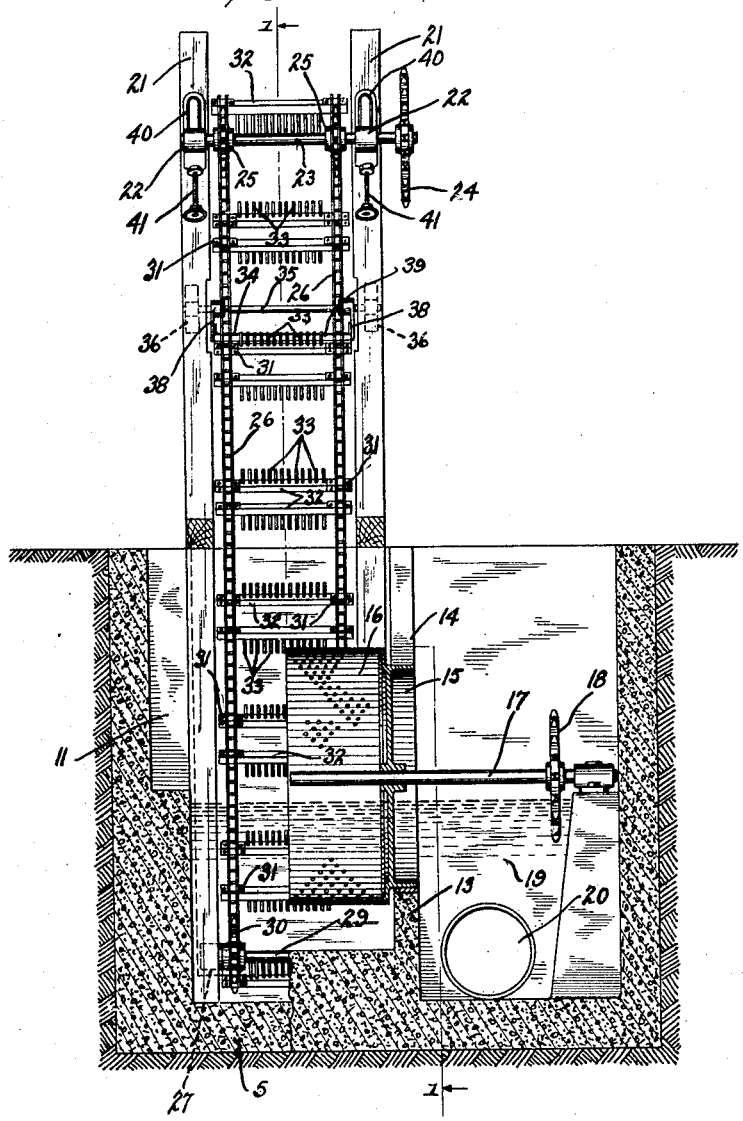

1,748,151

UNITED STATES PATENT OFFICE

JOSEPH J. STEHLING, OF MILWAUKEE, WISCONSIN, ASSIGNOR TO CHAS. H. STEHLING CO., OF MILWAUKEE, WISCONSIN, A CORPORATION OF WISCONSIN

REVOLVING SCREEN AND CONVEYER

Application filed September 15, 1927. Serial No. 219,773.

This invention relates to improvements in revolving screens and conveyers, particularly adapted for use in connection with the disposal of sewage from tanneries and the like.

The sewage from tanneries contains large amounts of solid animal matter as flesh, skin, hair, etc., and as laws prevent the disposal of such matter with the sewage, means must be provided for removing from the liquid sewage the solid matter referred to before the liquid sewage passes from the building into the municipal system.

It is, therefore, the primary object of the present invention to provide a sewage screen and conveyer which will eliminate the solid matter from the liquid sewage.

A further object of the invention is to provide a sewage screen and conveyer which will remove solid matter from liquid sewage and convey it to a desired position for convenient handling.

A further object of the invention is to provide a device of the class described having means for automatically cleaning the conveyer and keeping it free of solid matter, beyond the point where the load should be delivered, solid matter of this class being very tenacious.

A further object of the invention is to provide a revolving screen and conveyer which is of very simple construction, is strong and durable, is efficient in operation, and is well adapted for the purposes described.

With the above and other objects in view the invention consists of the improved revolving screen and conveyer, and its parts and combinations as set forth in the claims, and all equivalents thereof.

In the accompanying drawings in which the same reference characters indicate the same parts in both of the views:

Fig. 1 is a longitudinal sectional view through a drainage pit and the improved revolving screen and conveyer mounted therein, the view being indicated on line 1—1 of Fig. 2; and Fig. 2 is a cross sectional view of the same indicated on line 2—2 of Fig. 1.

Referring now more particularly to the drawings it will appear that the numeral 5 indicates a waste or sewage disposal pit, such as is common in tanneries and the like.

The pit is preferably formed of concrete and one end portion thereof has a comparatively shallow compartment 8 defined by an off-set bottom portion 6 and a vertical partition 7 (see Fig. 1). One of the walls of the pit, adjacent the compartment 8, is provided with an opening 9 at a predetermined distance above the bottom 6, and said opening allows an inflow of sewage through suitable pipes. The partition 7 is also formed with a lower opening 10 which permits the flow of the sewage into a large compartment 11 of the pit formed with a rearwardly sloping bottom 12. The compartment 11 is divided longitudinally by a partition 13 which is formed with a U-shaped slot 14 to receive the bearing portion 15 of a revoluble screen 16. The screen 16 is mounted on a shaft 17 which carries a sprocket wheel 18 which may be connected by a chain drive with any source of power (not shown). The screen is so positioned that the sewage must pass therethrough to flow into the pit chamber 19 and hence, the solid matter will be screened and only clear liquid will enter the chamber 19 and will be discharged therefrom through an outlet opening 20.

Naturally, the solid matter will accumulate within the pit compartment 11 and an important feature of the invention resides in the means employed for removing the solid matter from said compartment. For that purpose, a conveyer is utilized having its lower end mounted within the rear lower portion of the pit compartment 11 and extending upwardly and outwardly of the pit.

The conveyer comprises a pair of supporting members 21 mounted above the pit and carrying bearings 22 at their upper end portions in which is journaled a transverse shaft 23. Said shaft is driven by a sprocket wheel 24 mounted on its end portion and adapted to carry a chain drive (not shown). Also mounted fast on the shaft 23 inwardly of the supporting members 21 are a pair of spaced smaller sprocket wheels 25 over which elongated endless chains extend. A pair of opposed lower bearings 27 are mounted in the lower rear portion of the pit compartment 11 and for that purpose the side walls of said compartment are provided with vertical slots or channels 28. A lower shaft 29 has its end portions journaled in said bearings 27 and said shaft has fast thereon a pair of spaced sprocket wheels 30 over which the lower end portions of the endless chains 26 pass. At spaced intervals the pair of chains 26 are formed with opposed angle members 31 and to the opposed angle members the end portions of transverse bars 32 are secured. Each bar 32 is provided with a row of inwardly projecting fingers or pegs 33, the pegs of each row terminating inwardly of the chains 26 so as not to interfere therewith.

The conveyer is provided with a peg cleaning or scraping member designated generally by the numeral 34 and mounted slightly below the upper end portion of the conveyer. Said scraping member consists of a rod 35 revolubly mounted in brackets 36 carried by upright supports 37 and fast on said rod are a pair of spaced arms 38 connected at their outer end portions by a transverse scraping bar 39. As shown in Fig. 2 the arms 38 are outwardly of the sides of the conveyer chains 26 and as seen from Fig. 1 the scraping bar 39 overlies the under layer of the conveyer. The result is that when said conveyer travels in the direction of the arrow in Fig. 1, each row of pegs will engage the scraping bar and cause the scraping member to move pivotally upwardly along said pegs, cleaning the same, as shown in dotted lines, until it drops over the ends of the pegs to normal position for operation on the next row of pegs.

It should be noted that the upper bearings 22 are adjustably mounted in slotted members 40 and are retained in adjusted position by turn screws 41. By this arrangement said bearings may be moved to take up slack in the conveyer.

In operation the sewage is screened as described and the conveyer operates in the pit compartment containing the solid matter. This material is picked up by the conveyer pegs and elevated to a point above the pit where it is removed by the scraping member and permitted to drop to a convenient position above the pit for removal and disposal.

From the foregoing description it will be seen that the improved revolving screen and conveyer is of very simple and novel construction, and is well adapted for the purpose described.

What I claim as my invention is:

1. The combination with an inclined elevator member, of a plurality of fingers carried by said elevator, and pivotal means connected with an upper portion of said elevator for automatically cleaning said fingers and actuated by direct engagement with said fingers.

2. A conveyer, comprising an inclined elevator member, a plurality of fingers carried by said elevator and arranged in rows transversely of the elevator for carrying solid material, and a scraping member pivotally mounted adjacent an upper portion of the elevator and having a scraping portion extending transversely of said elevator for engagement with said fingers, said scraping member being moved by engagement with the fingers.

3. The combination with an inclined endless elevator member, of a plurality of fingers carried by said elevator and arranged in rows transversely of the elevator for carrying solid material, and a scraping member pivotally mounted adjacent the elevator and having a scraping portion extending transversely of said elevator for engagement with said fingers, said scraping member being moved by engagement with the fingers and moving lengthwise of the same.

4. The combination with a revoluble inclined endless elevator member of a plurality of rows of fingers carried by said elevator member, and a scraping member pivotally mounted adjacent an outer portion of the elevator member and having a transverse blade overlying a portion of the elevator member for engagement with rows of said fingers, said scraping member being moved by engagement with the fingers and moving lengthwise of the same.

5. The combination with a revoluble, inclined endless elevator having an elongated longitudinal travel of a plurality of rows of fixed fingers carried by said elevator member and projecting inwardly, and a scraping member pivotally mounted adjacent an outer portion of the elevator member and embracing a portion of the same and having a transverse blade overlying an inner portion of the elevator member for engagement with rows of said fingers, said scraping member being moved by engagement with the fingers and being carried thereby in scraping engagement lengthwise of the fingers.

In testimony whereof, I affix my signature.

JOSEPH J. STEHLING.